US010637753B1

(12) United States Patent
Taft et al.

(10) Patent No.: US 10,637,753 B1
(45) Date of Patent: Apr. 28, 2020

(54) MANAGING A 5G NETWORK USING EXTENSION INFORMATION

(71) Applicant: Verizon Patent and Licensing Inc., Arlington, VA (US)

(72) Inventors: David Taft, Keller, TX (US); Maqbool Chauhan, Keller, TX (US); Imtiyaz Shaikh, Irving, TX (US); Jerry Steben, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/378,851

(22) Filed: Apr. 9, 2019

(51) Int. Cl.
*H04W 24/10* (2009.01)
*H04L 12/26* (2006.01)
*H04L 12/24* (2006.01)

(52) U.S. Cl.
CPC ............ *H04L 43/04* (2013.01); *H04L 41/04* (2013.01); *H04W 24/10* (2013.01)

(58) Field of Classification Search
CPC ............ G06F 11/3065; G06F 11/3409; G06F 2009/4557; G06F 2009/45591; G06F 9/45558; G06F 9/5027; G06F 9/5077; G06F 11/3006; G06F 11/301; G06F 11/3438; G06F 11/3442; H04L 43/04; H04L 41/04; H04L 41/5009; H04L 41/5019; H04L 43/08; H04W 24/10; H04W 12/06; H04W 48/16; H04W 48/18; H04W 60/00; H04W 60/04; H04W 8/12
See application file for complete search history.

(56) References Cited

U.S. PATENT DOCUMENTS

| 2015/0082308 | A1* | 3/2015 | Kiess | G06F 9/5072 |
| | | | | 718/1 |
| 2015/0244702 | A1* | 8/2015 | Nathan | H04L 63/083 |
| | | | | 726/6 |
| 2016/0099857 | A1* | 4/2016 | Begwani | H04L 43/08 |
| | | | | 370/252 |
| 2016/0212033 | A1* | 7/2016 | Augenstine | H04L 45/00 |
| 2016/0294987 | A1* | 10/2016 | Tian | H04L 69/22 |
| 2017/0331670 | A1* | 11/2017 | Parkvall | H04W 52/0274 |
| 2017/0373938 | A1* | 12/2017 | Raether | H04L 41/0816 |
| 2018/0132117 | A1* | 5/2018 | Senarath | G06F 11/3006 |
| 2018/0139116 | A1* | 5/2018 | Ricci | H04L 43/0876 |
| 2018/0227871 | A1* | 8/2018 | Singh | H04W 60/00 |

(Continued)

*Primary Examiner* — Nathan S Taylor

(57) ABSTRACT

A computer device may include a memory storing instructions and processor configured to execute the instructions to maintain a repository of network function devices in a network; obtain a transport network key performance indicator (KPI) for a particular network function device in the network; and generate an administration weight based on the obtained transport network KPI, wherein the administration weight corresponds to a measure of performance associated with the particular network function device. The processor may be further configured to receive, from a requesting network function device, a network function discovery request for a network function type associated with the particular network function device; and provide a network function discovery answer to the requesting network function device, wherein the network function discovery answer includes the generated administration weight for the particular network function device.

20 Claims, 9 Drawing Sheets

(56) References Cited

U.S. PATENT DOCUMENTS

| | | | |
|---|---|---|---|
| 2019/0042297 A1* | 2/2019 | Connor | G06F 9/45558 |
| 2019/0050248 A1* | 2/2019 | Oohira | G06F 9/45558 |
| 2019/0058508 A1* | 2/2019 | Yiu | H04B 7/043 |
| 2019/0068476 A1* | 2/2019 | Ranjit | H04L 43/10 |
| 2019/0116506 A1* | 4/2019 | Bendlin | H04B 17/17 |
| 2019/0140972 A1* | 5/2019 | Xu | G06F 16/245 |
| 2019/0149998 A1* | 5/2019 | Yang | H04W 16/04 |
| 2019/0174449 A1* | 6/2019 | Shan | H04W 60/04 |
| 2019/0245747 A1* | 8/2019 | Balmakhtar | G06F 9/44 |
| 2019/0268213 A1* | 8/2019 | Zhou | H04L 41/0246 |
| 2019/0273663 A1* | 9/2019 | Balmakhtar | H04L 41/20 |

* cited by examiner

| SLICE ID 610 | SLICE REQUIREMENTS 620 | NETWORK FUNCTION INSTANCE 640 | NETWORK FUNCTION TYPE 650 | INSTANCE KPI 660 | PATH 670 | PATH KPI 680 | ADMIN WEIGHT 690 |
|---|---|---|---|---|---|---|---|

| SLICE 910 | SLICE REQUIREMENT 920 | NF INSTANCE 930 | NF INSTANCE LATENCY 940 | PATH 950 | PATH LATENCY 960 | ADMIN WEIGHT 970 |
|---|---|---|---|---|---|---|
| A | < 100 ms | UPF A1 | 20 ms | DN A | 20 ms | 1 |
| A | < 100 ms | UPF A2 | 30 ms | DN A | 20 ms | 5 |
| B | < 50 ms | UPF B1 | 10 ms | DN B | 10 ms | 1 |
| B | < 50 ms | UPF B2 | 30 ms | DN B | 30 ms | 10 |
| C | < 10 ms | UPF C1 | 5 ms | DN C | 5 ms | 1 |
| C | < 10 ms | UPF C2 | 5 ms | DN C | 10 ms | 10 |

FIG. 9

MANAGING A 5G NETWORK USING EXTENSION INFORMATION

BACKGROUND INFORMATION

In order to satisfy the needs and demands of users of mobile communication devices, providers of wireless communication services continue to improve and expand available services as well as networks used to deliver such services. One aspect of such improvements includes the development of core networks as well as options to utilize such core networks. A core network may manage a large number of devices experiencing different conditions. Managing all the different devices associated with different conditions poses various challenges.

BRIEF DESCRIPTION OF THE DRAWINGS

FIG. 6 is a diagram illustrating exemplary components of the network repository function (NRF) database of FIG. 4 according to an implementation described herein;

FIG. 9 is a diagram of an exemplary network repository function table according to an implementation described herein.

DETAILED DESCRIPTION OF PREFERRED EMBODIMENTS

Figure 1:
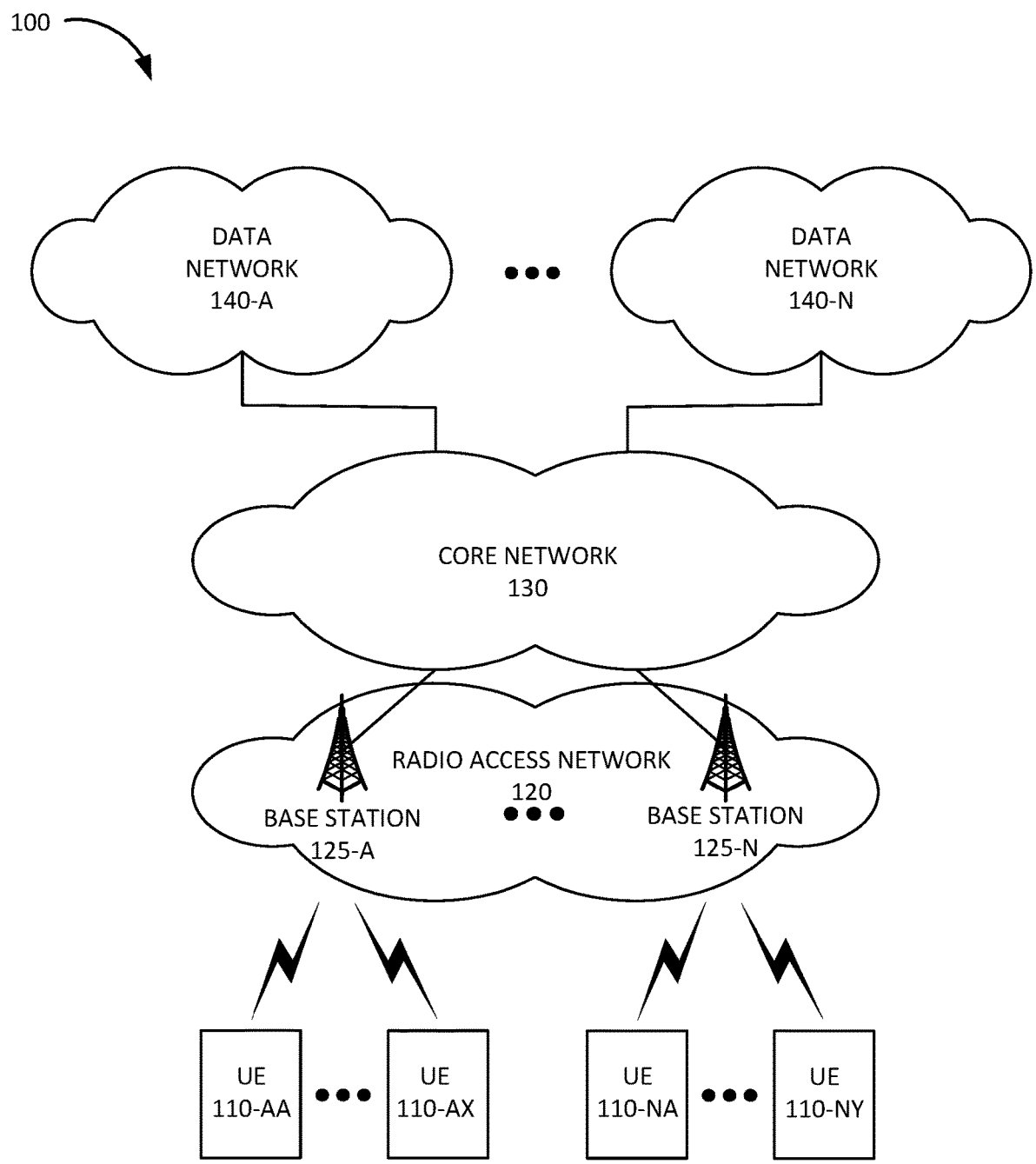
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks have become increasingly more complex. One way in which wireless access networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

Moreover, improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, type of service, and/or particular enterprise customer associated with a set of UE devices.

In order to implement functionality such as network slicing, a 5G core network may include various network nodes, known as network functions (NFs). One such NF in a 5G core network is the Network Repository Function (NRF). An NRF may provide NF registration, management, discovery, and/or authentication services within the 5G core. For example, when a new NF, such as, for example, an Access and Mobility Management Function (AMF) is brought online, the AMF may register its reachability and services information with the NRF so that other NFs in the 5G core network are able to communicate with the AMF. When another network component, such as, for example, a gNodeB base station, needs to communicate with an AMF, the gNodeB may send a request to the NRF for an available AMF and the NRF may provide the reachability and other information relating to the AMF to the requesting gNodeB.

The NRF may store information identifying multiple NF devices for a particular NF type. For example, the NRF may identify multiple User Plane Functions (UPFs) in a particular network slice. However, the stored information relating to the NF devices may not be enough to enable a requesting NF to select the most appropriate NF device for a particular network service. For example, the network slice associated with the particular network service may have a requirement (e.g., a latency requirement) and the requesting NF may not be able to determine which NF devices, out of the NF devices available to carry out the particular network service, will be able to satisfy the network slice requirement.

The term "NF device," as used herein, may refer to a dedicated hardware component implementing an NF instance or to a hardware component that is part of a common shared physical infrastructure used to implement virtualized NF instances using SDN or another type of virtualization technique. Thus, the "NF device" may be configured to implement a particular NF instance as a Virtual Network Function (VNF) (e.g., in a virtual machine), as a Cloud-native Network Function (CNF) (e.g., in a container), as a serverless architecture event handler, and/or using a different type of virtualization implementation. The common shared physical infrastructure may be implemented using one or more computer devices in a cloud computing center, a mobile edge computing (MEC) system associated with a base station, and/or in another type of computer system.

Implementations described herein relate to extensions to 5G NRF functionality. A computer device configured to implement a 5G NRF may extend the functionality of the 5G NRF to include maintaining an administration weight for particular NF devices registered with the NRF. The administration weight for a particular NF device may correspond to a measure of performance associated with the particular NF. For example, the administration weight may be based on one or more transport network key performance indicators (KPIs) associated with the particular NF.

Thus, a computer device may be configured to maintain a repository of NF devices in a 5G network; obtain a transport network KPI for a particular NF device in the 5G network; and generate an administration weight based on the obtained transport network KPI that corresponds to a measure of performance associated with the particular NF device. The computer device may further be configured to receive, from a requesting 5G NF device (e.g., a Session Management Function (SMF) device, an Application Function (AF) device, etc.), a 5G NF discovery request for an NF type associated with the particular NF device and provide a 5G NF discovery answer to the requesting 5G NF device. The discovery answer may include the generated administration weight for the particular NF device. The requesting NF may then determine whether to select the particular NF device to carry out a network service based on the administration weight associated with the particular NF device.

The transport network KPI may include at least one of a packet loss KPI, a packet delay KPI, or a load capacity KPI and may be received from an SDN controller associated with the particular NF device. The SDN controller may implement the particular NF device as a VNF instance, as a CNF instance, as a serverless architecture event handler, and/or using a different type of implementation. The SDN controller may be configured as a 5G AF instance that reports the transport KPIs to the NRF via a 5G Naf interface.

Generating the administration weight based on the obtained transport network KPI may include determining a set of transport network KPIs for a network path associated with the particular NF device and generating the administration weight as a weighted sum of the set of transport network KPIs. Additionally, or alternatively, generating the administration weight based on the obtained transport network KPI may include determining whether the obtained transport network KPI satisfies a service requirement associated with a network slice associated with the particular NF device.

Furthermore, in some implementations, the NRF may be further configured to obtain one or more wireless network KPIs for the particular NF device from a Network Data Analytics Function (NWDAF) device associated with the 5G network and the administration weight may be further based on the obtained one or more wireless network KPIs. The one or more wireless network KPIs may include, for example, accessibility KPIs (e.g., a Radio Resource Control (RRC) setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), a radio access network 120, a core network 130, and data networks 140-A to 140-N.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wrist-watch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include base stations 125-A to 125-N (referred to herein collectively as "base stations 125" and individually as "base station 125"). Each base station 125 may service a set of UE devices 110. For example, base station 125-A may service UE devices 110-AA to 110-AX, etc., to base station 125-N, which may service UE devices 110-NA to 110-NY. In other words, UE devices 110-AA to 110-AX may be located within the geographic area serviced by base station 125-A, and other UE devices 110 may be serviced by another base station 125.

Base station 125 may include a 5G base station (e.g., a gNodeB) that includes one or more radio frequency (RF) transceivers (also referred to as "cells" and/or "base station sectors") facing particular directions. For example, base station 125 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 125 may also include a 4G base station (e.g., an eNodeB). Furthermore, in some implementations, base station 125 may include a mobile edge computing (MEC) system that perform cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS).

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Furthermore, core network 130 may include an LTE Advanced (LTE-A) access network and/or a 5G core network or other advanced network that includes functionality such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
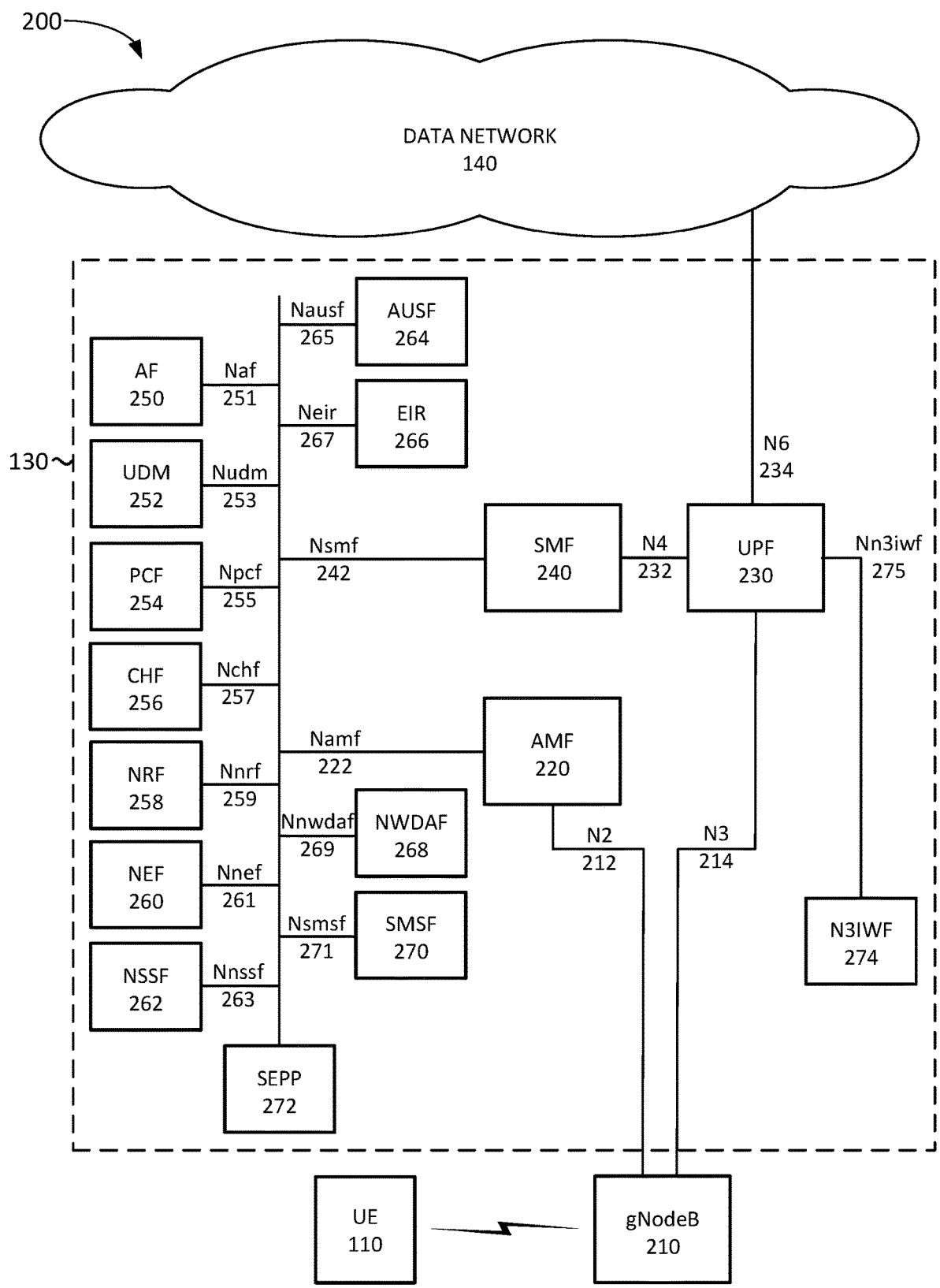
FIG. 2 is a diagram illustrating exemplary components of the core network of FIG. 1 according to an implementation described herein.

FIG. 2 is a diagram illustrating a system 200 that includes exemplary components of core network 130 in the context of environment 100 according to an implementation described herein. As shown in FIG. 2, system 200 may include UE device 110, gNodeB 210, core network 130, and data network 140.

gNodeB 210 (corresponding to base station 125) may include one or more devices (e.g., base stations) and other components and functionality that enable UE device 110 to wirelessly connect to access network 120 using 5G NR Radio Access Technology (RAT). For example, gNodeB 210 may service one or more cells, with each cell being served by a wireless transceiver with an antenna array configured for mm-wave wireless communication. gNodeB 210 may correspond to base station 125. gNodeB 210 may communicate with AMF 220 using an N2 interface 212 and communicate with UPF 230 using an N3 interface 214.

Core network 130 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 130 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with base stations 125.

AMF 220 may perform registration management, connection management, reachability management, mobility management, lawful intercepts, Short Message Service (SMS) transport between UE device 110 and an SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network KPIs associated with the NF device/instance. NRF 258 may be accessible via an Nnrf interface 259.

NEF 260 may expose capabilities and events to other NFs, including $3^{rd}$ party NFs, AFs, edge computing NFs, and/or other types of NFs. Furthermore, NEF 258 may secure provisioning of information from external applications to core network 130, translate information between core network 130 and devices/networks external to core network 130, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 130. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 120 and the non-3GPP access device. N3IWF 274 maybe accessible via Nn3iwf interface 275.

Although FIG. 2 shows exemplary components core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Unified Data Repository (UDR), an Unstructured Data Storage Network Function (UDSF), an a Location Management Function (LMF), a Lawful Intercept Function (LIF), a binding session function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
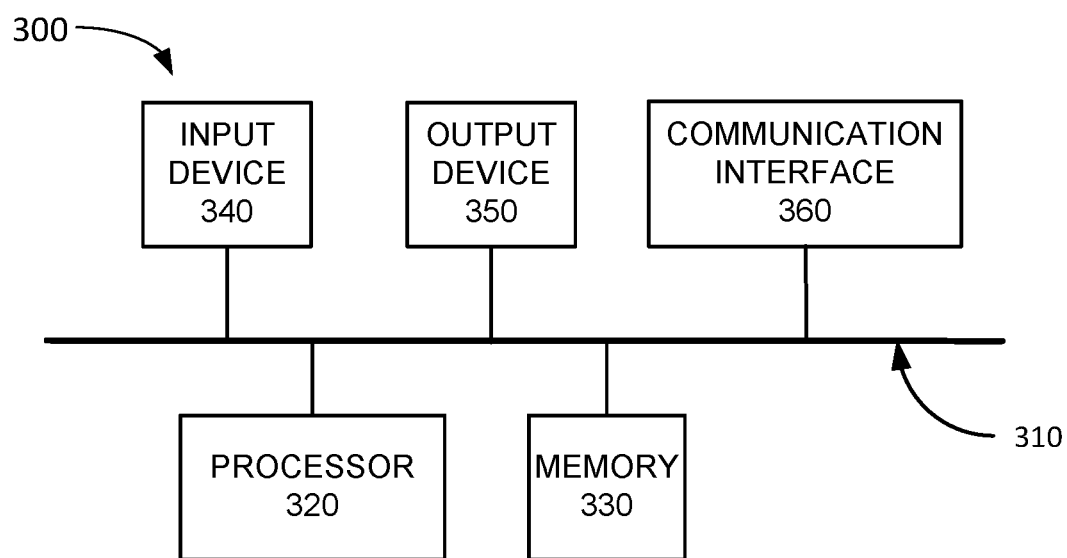
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to NRF management and reporting KPI information relating to NF devices to an NRF. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
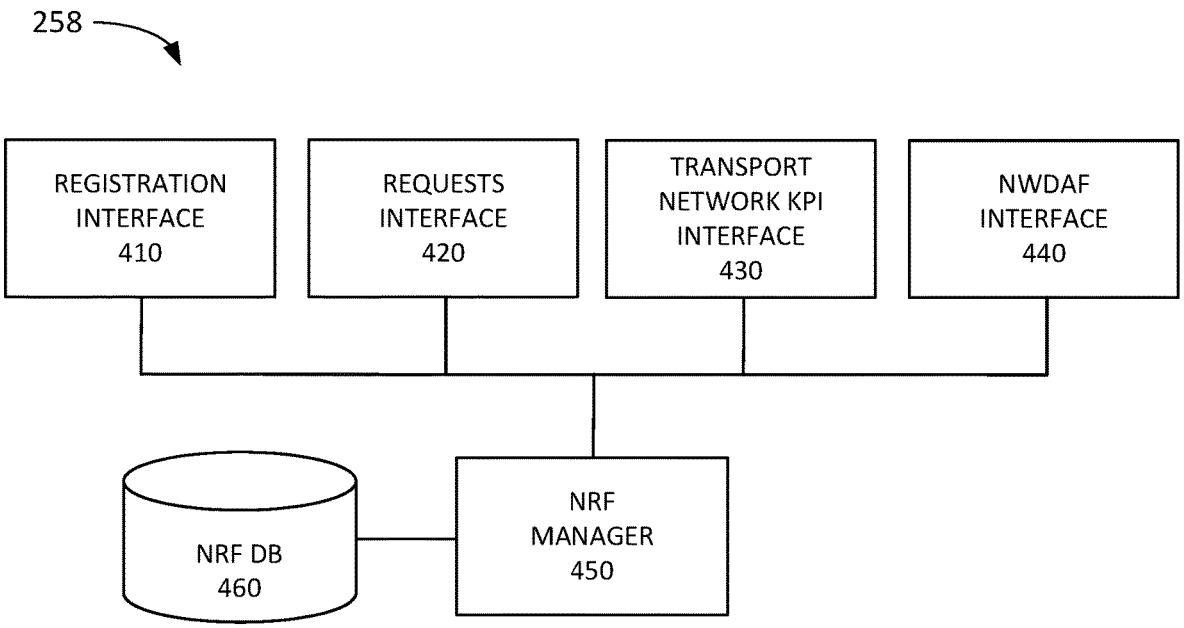
FIG. 4 is a diagram illustrating exemplary components of the network repository function of FIG. 2 according to an implementation described herein.

FIG. 4 is a diagram illustrating exemplary components of NRF 258. The components of NRF 258 may be implemented, for example, via processor 320 executing instructions from memory 330. Alternatively, some or all of the components of NRF 258 may be implemented via hardwired circuitry. As shown in FIG. 4, NRF 258 may include a registration interface 410, a requests interface 420, a transport network KPI interface 430, a NWDAF interface 440, an NRF manager 450, and an NRF database (DB) 460.

Registration interface 410 may be configured to receive a registration message from an NF device in core network 130. For example, when a new NF device is brought online and/or activated in core network 130, the new NF device may register with NRF 258 via registration interface 410. The registration message may include, for example, an NF instance ID associated with an NF instance, information identifying the type of NF associated with the NF instance, a PLMN ID associated with the NF instance, network slices associated with the NF instance, endpoint information for each supported service associated with the NF, and/or other types of NF information.

Requests interface 420 may be configured to respond to discovery requests for particular types of NFs. For example, if an SMF 240 needs to find a UPF device, SMF 240 may send a discovery request to NRF 258 via requests interface 420 for an available UPF 230 and NRF 258 may respond to the discovery request with information identifying one or more available UPFs 230. Transport network KPI interface 430 may be configured to receive information relating to transport network KPIs associated with particular NF devices. For example, an SDN controller associated with a particular NF instance may monitor one or more transport network KPIs associated with the particular NF instance, such as, for example, a packet loss KPI, a packet delay KPI, a load capacity KPI, and/or another type of transport network KPI, and may report the one or more transport network KPIs to NRF 258 via transport network KPI interface 430.

NWDAF interface 440 may be configured to receive wireless network KPIs associated with particular NF devices in radio access network 120 and/or core network 130 from NWDAF 268. NRF manager 450 may manage NRF functionality associated with NRF 258, such as registering NF devices, responding to NF requests, and/or receiving and storing KPI information relating to NF devices in core wireless network 130 in NRF DB 460. NRF DB 460 may store NF profiles of registered NFs. Each NF profile may include, for a particular NF instance, an NF instance ID, an NF type, a PLMN ID associated with the NF, network slice IDs associated with the NF, capacity information for the NF, service authorization information for the NF, supported services associated with the NF, endpoint information for each supported service associated with the NF, and/or other types of NF information. Additional exemplary information that may be stored in NRF DB 460 is described below with reference to FIG. 6.

Although FIG. 4 shows exemplary components of NRF 258, in other implementations, NRF 258 may include fewer components, different components, differently arranged components, or additional components than depicted in FIG. 4. Additionally, or alternatively, one or more components of NRF 258 may perform functions described as being performed by one or more other components of NRF 258.

Figure 5:
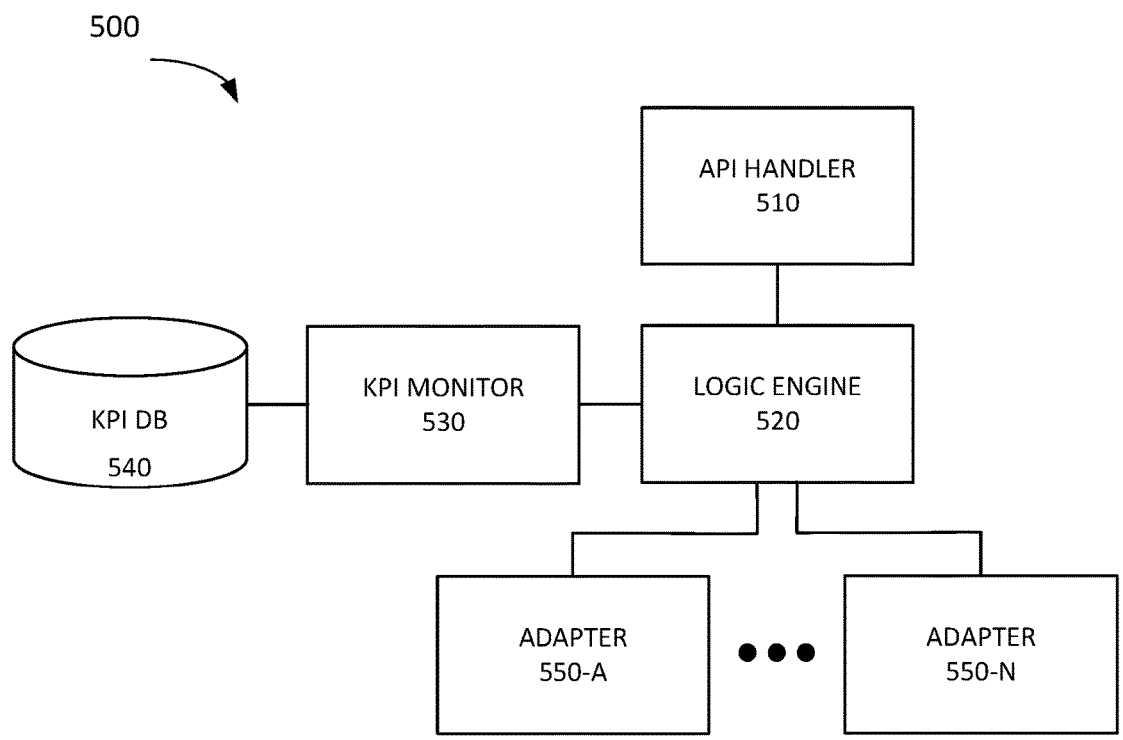
FIG. 5 is a diagram illustrating exemplary components of a software defined networking controller associated with a component of FIG. 1 or FIG. 2 according to an implementation described herein.

FIG. 5 is a diagram illustrating exemplary components of SDN controller 500. The components of SDN controller 500 may be implemented, for example, via processor 320 executing instructions from memory 330. Alternatively, some or all of the components of SDN controller 500 may be implemented via hard-wired circuitry. As shown in FIG. 5, SDN controller 500 may include an application programming interface (API) handler 510, a logic engine 520, a KPI monitor 530, a KPI DB 540, and adapters 550-A to 550-N (referred to herein collectively as "adapters 550" and individually as "adapter 550").

API handler 510 may manage one or more APIs associated with NFs implemented by SDN controller 500. For example, API handler 510 may receive an API request from another NF in core network 130, may provide the API request to logic engine 520, and may send a response from logic engine 520 to the requesting NF. Additionally, API handler 510 may generate API requests to other NFs in core network 130.

Logic engine 520 may route messages between adapters 550 and between adapters 550 and API handler 510. KPI monitor 530 may monitor one or more transport network KPIs associated with particular adapters 550 and store the KPI information in KPI DB 540. The transport network KPIs may include a packet loss KPI, a packet delay KPI, a packet throughput KPI, a load capacity KPI, and/or another type of transport network KPI associated with an NF implemented by a particular adapter 550.

Each adapter 550 may implement a virtualized NF of a particular NF type. As an example, adapter 550 may implement a VM on the underlying physical infrastructure. The VM may include an operating system and an application implementing a particular virtualized NF instance. As another example, a set of adapters 550 may each implement a container on top of an existing virtualized architecture, with each container implementing a particular virtualized NF instance.

Although FIG. 5 shows exemplary components of SDN controller 500, in other implementations, SDN controller 500 may include fewer components, different components, differently arranged components, or additional components than depicted in FIG. 5. Additionally, or alternatively, one or more components of SDN controller 500 may perform functions described as being performed by one or more other components of SDN controller 500.

FIG. 6 is a diagram illustrating exemplary information stored in NRF DB 460 according to an implementation described herein. As shown in FIG. 6, NRF DB 460 may include one or more slice records 600. Each slice record 600 may store information relating to a particular slice. Each slice record 600 may include a slice ID field 610, a slice requirements field 620, and one or more NF instance records 630.

Slice ID field 610 may store an ID associated with a particular slice. Slice requirements field 620 may store one or more service requirements associated with the particular slice, such as, for example, a latency requirement associated with the particular slice, a maximum packet loss requirement associated with the particular slice, a throughput requirement associated with the particular slice, a maximum error rate requirement associated with the particular slice, and/or another type of requirement associated with the particular slice.

Each NF instance record 630 may store information relating to a particular NF device/instance associated with the particular slice of slice record 600. NF instance record 630 may include an NF instance field 640, an NF type field 650, an instance KPI field 660, a path field 670, a path KPI field 680, and an administration (admin) weight field 690.

NF instance field 640 may identify a particular NF instance in core network 130. NF type field 650 may identify the NF type associated with the particular NF instance, such as, for example, an AMF, UPF, SMF, AF, UDM, PCF, CHF, NRF, NEF, NSSF, AUSF, EIR, NWDAF, SMSF, SEPP, N3IWF, and/or another type of NF in core network 130. Instance KPI field 660 may include a history of one or more transport KPIs measured for the particular NF instance and received from SDN controller 500 associated with the particular NF instance. The transport KPIs may include a packet loss KPI, a packet delay KPI, a packet throughput KPI, a load capacity KPI, and/or another type of transport network KPI measured for the particular NF instance.

Path field 670 may store information identifying a network path associated with the particular NF instance. For example, if the particular NF instance corresponds to a particular UPF 230, the path may include a path from the particular UPF 230 to a particular data network 140 for which the particular UPF 230 acts as a gateway. Additionally, the path may include a path from a particular gNodeB 210 to the particular UPF 230. Path KPI field 680 may store one or more transport network KPIs measured for the path, identified in the network path associated with the particular NF instance. Additionally, instance KPI field 660 and/or path KPI field 680 may store one or more wireless network KPIs obtained from NWDAF 268.

Admin weight field 690 may include an administration score computed for the particular NF instance based on KPI information stored in instance KPI field 660 and path KPI field 680. For example, the administration weight may be based on a weighted average of KPI values stored in instance KPI field 660 and path KPI field 680. As another example, the administration weight may be based on a scale (e.g., linear scale, logarithmic scale, etc.) that relates particular KPI values to a particular measure of performance, such as a measure of latency, a measure of loss, a measure of capacity, and/or another type of measure. As yet another example, the administration weight may indicate whether the KPI values associated with the particular NF instance satisfy a particular service requirement (e.g., administration weight values above a particular threshold value corresponding to not satisfying the particular service requirement and administration weights equal to or below the particular threshold value corresponding to satisfying the particular service requirement).

Although FIG. 6 shows exemplary components of NRF DB 460, in other implementations, NRF DB 460 may include fewer components, different components, additional components, or differently arranged components than depicted in FIG. 6.

Figure 7:
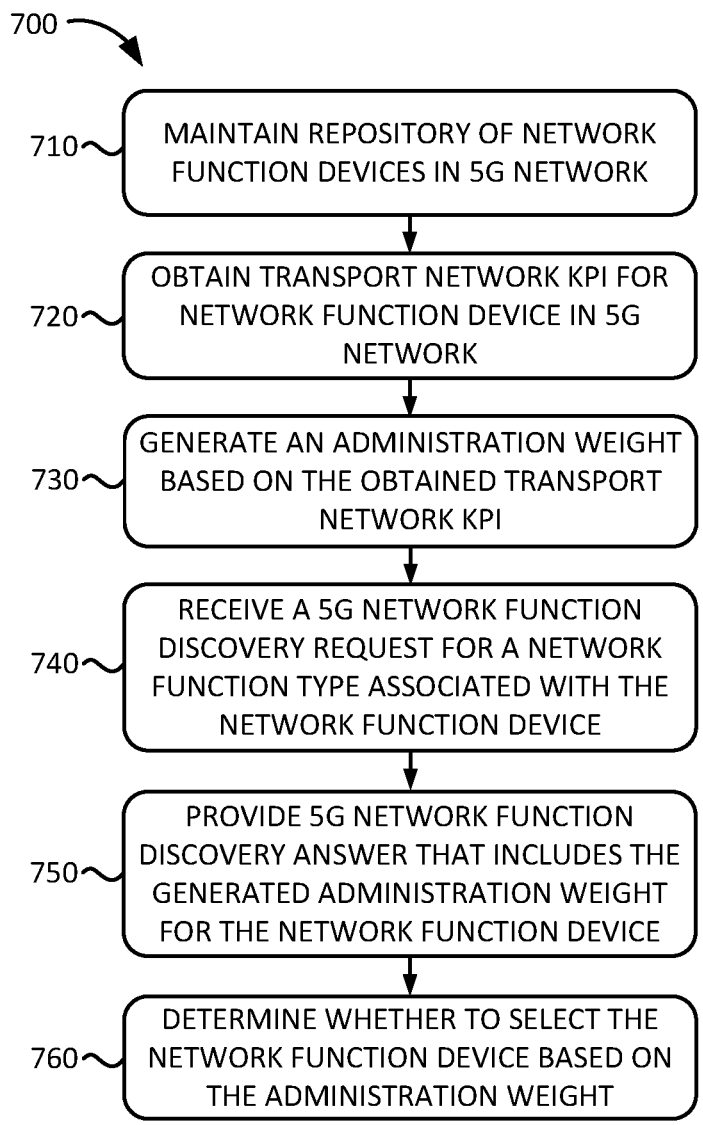
FIG. 7 is a flowchart of a process for implementing a network repository function according to an implementation described herein.

FIG. 7 is a flowchart of a process for implementing an NRF according to an implementation described herein. In some implementations, the process of FIG. 7 may be performed by NRF 258. In other implementations, some or all of the process of FIG. 7 may be performed by another device or a group of devices separate from NRF 258.

The process of FIG. 7 may include maintaining a repository of NF devices in a 5G network (block 710). For example, SDN controller 500 may include adapter 550 that implements NRF 258 in core network 130. NRF 258 may include a DB that stores NF instance profile information relating to NF instances in core network 130, along with KPI information measured and collected for the NF instances.

A transport network KPI for an NF device in the 5G network may be obtained (block 720) and an administration weight may be generated based on the obtained transport network KPI (block 730). For example, NRF 258 may receive, at particular intervals, and/or in response to particular trigger events, one or more KPI values measured for the NF device, and/or a path associated with the NF device, by SDN controller 500 associated with the particular NF device. NRF 258 may compute an administration weight for the particular NF device based on the one or more KPI values. The administration weight may be based on a weighted average of the one or more KPI values, based on a scale that relates particular KPI values to a particular measure of performance (e.g., a measure of latency, a measure of loss, a measure of capacity, etc.), based on whether the KPI values associated with the particular NF device satisfy a particular service requirement, and/or based on another type of calculation.

A 5G NF discovery request for an NF type associated with the NF device may be received (block 740) and a 5G NF discovery answer that includes the generated administration weight for the NF device may be provided (block 750). For example, AMF 220 may send a 5G NF discovery request to NRF 258 for AF 250 instances associated with a particular application and/or service and NRF 258 may respond with a 5G NF discovery answer that identifies AF 250 instances that satisfy the conditions specified in the 5G NF discovery request. The 5G NF discovery answer may include administration weight values associated with the identified NF instances.

A determination may be made as to whether to select the NF device based on the administration weight (block 760). The requesting NF device may select a particular NF device from the identified NF devices based on the administration weight values associated with the identified NF devices. As an example, AMF 220 may select a particular AF 250 instance with the lowest administration weight. As another example, AMF 220 may select a particular AF 250 with an administration weight that satisfies the service requirements for a service to be performed by the particular AF 250.

Figure 8:
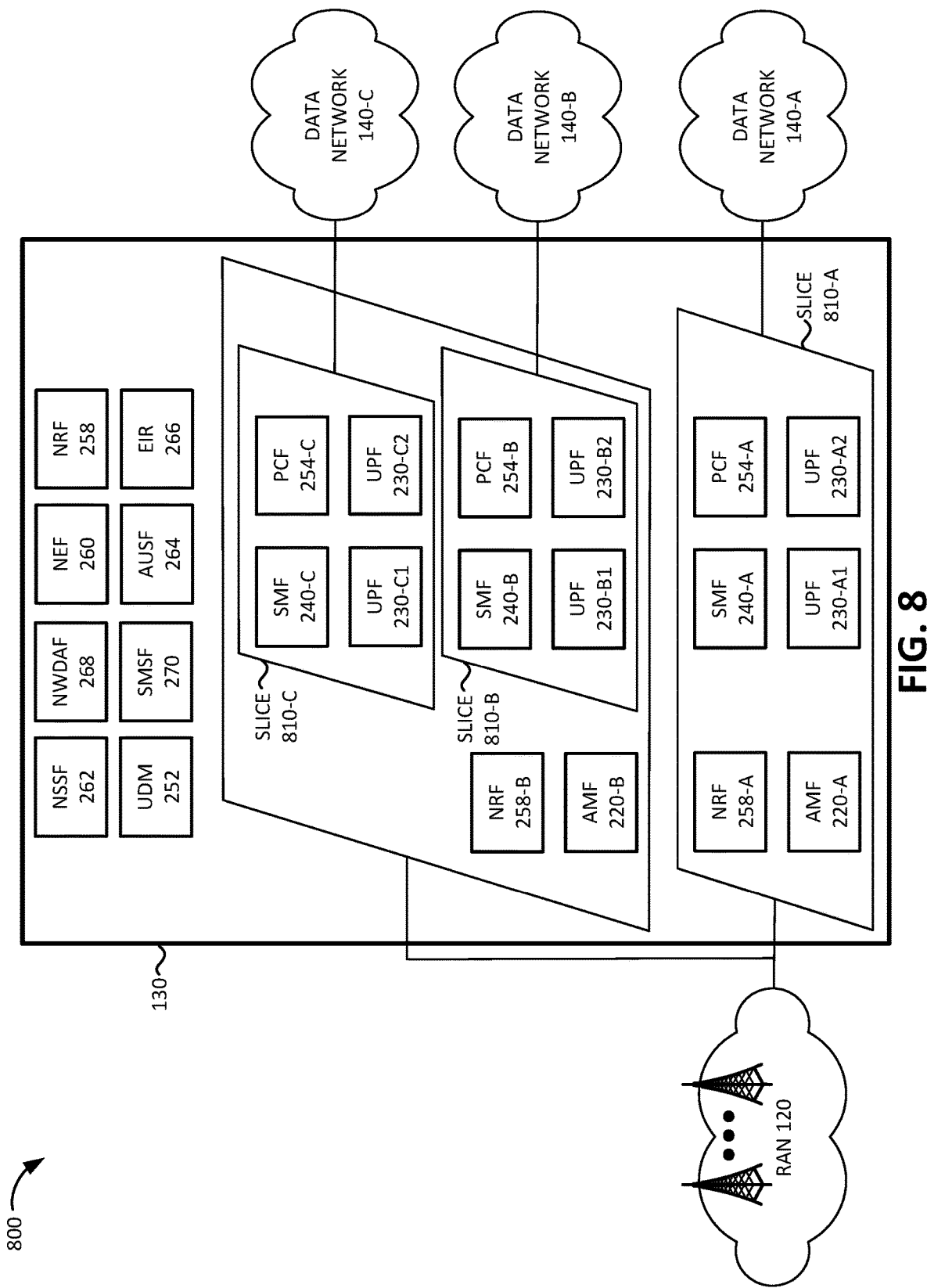
FIG. 8 is a diagram of an exemplary system according to an implementation described herein.

FIG. 8 is a diagram of an exemplary system 800 according to an implementation described herein. As shown in FIG. 8, system 800 may include core network 130 that includes NFs common to all slices in core network 130. The NFs common to all slices may include UDM 252, NRF 258, NEF 260, NSSF 262, EIR 266, and NWDAF 268. Furthermore, core network 130 may include a first slice 810-A associated with a first data network 140-A. First slice 810-A may include AMF 220-A, UPF 230-A1, UPF 230-A2, SMF 240-A, PCF 254-A, and NRF 258-A. Moreover, core network 130 may include a second slice 810-B, associated with data network 140-B, and a third slice 810-C, associated with data network 810-C. Second slice 810-B may include UPF 230-B1, UPF 230-B2, SMF 240-B, and PCF 254-B. Third slice 810-C may include UPF 230-C1, UPF 230-C2, SMF 240-C, and PCF 254-C. Second slice 810-B and third slice 810-C may share common NFs AMF 220-B and NRF 258-B. Thus, core network 130 may include NF instances that are shared by all slices, that are shared by a subset of slices, or that are used by a single slice. In particular, core network 130 may include an NRF instance shared by all slices, an NRF instance shared by a subset of slices, and an NRF instance used by a single slice.

FIG. 9 is a diagram of an exemplary NRF table 900 according to an implementation described herein that is associated with system 900. NRF table 900 may be stored in NRF 258 shared by all slices of core network 130. As shown in FIG. 9, NRF table 900 may include a slice column 910, a slice requirement column 920, an NF instance column 930, an NF instance latency column 940, a path column 950, a path latency column 960, and an admin weight column 970. Slice column 910 may identify a particular slice (e.g., slice 810-A, 810-B, or 810-C). Slice requirement column 920 may identify a latency requirement associated with the particular slice. NF instance column 930 may identify a particular UPF instance in the particular slice. NF instance latency column 940 may identify a latency value measured for the particular UPF instance. Path column 950 may identify a path associated with the particular UPF, such as a path to a particular data network (DN) 140-A, 140-B, or 140-C. Path latency column 960 may identify a latency value measured for the particular path. Admin weight column 970 may store an admin weight value computed for the particular UPF based on the latency value associated with the particular UPF and the latency value associated with the particular path. For example, in this case, a low admin weight value may indicate a low latency and a high admin weight value may indicate a high latency.

Figure 10:
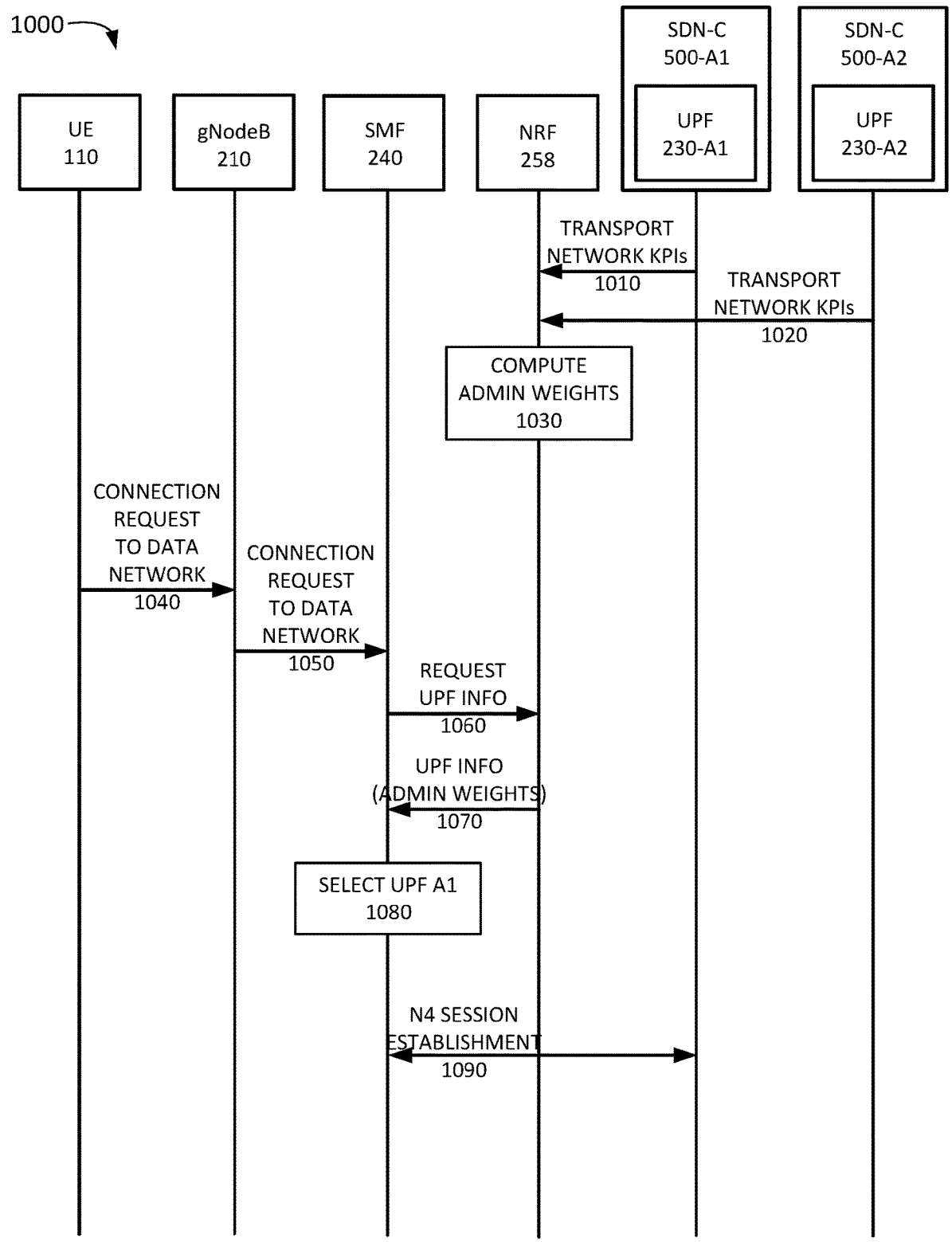
FIG. 10 is a diagram of an exemplary signal flow according to an implementation described herein.

FIG. 10 is a diagram of an exemplary signal flow 1000 according to an implementation described herein. As shown in FIG. 10, signal flow 1000 may include SDN controller (SDN-C) 500-A1 sending transport network KPIs relating to UPF 230-A1 to NRF 258 (signal 1010) and SDN-C 500-A2 sending transport network KPIs relating to UPF 230-A2 to NRF 258 (signal 1020). NRF 258 may store the received transport network KPIs and may compute admin weights based on the received transport network KPIs (block 1030).

At a later time, UE device 110 may request a connection to data network 140-A via gNodeB 210 using a Radio Resource Control (RRC) session establishment request (signal 1040). gNodeB 210 may send a protocol data unit (PDU) session establishment request to AMF 220 and AMF 220 may select SMF 240 and send a PDU session create request to SMF 240 (shown as signal 1050 as AMF 220 is not shown in FIG. 10). SMF 240 may send a discovery request to NRF 258 to identify UPF instances (signal 1060) and NRF 258 may respond to the request with information relating to UPFs 230-A1 and 230-A2 (signal 1070). The response by NRF 258 may include admin weight values from NRF table 900 for UPFs 230-A1 and 230-A2. Based on the received admin weight values, SMF 240 may select UPF 230-A1 (block 1080) and may then establish an N4 session to set up a data connection to data network 140-A via the selected UPF 230-A1 (signal 1090).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals with respect to FIG. 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   maintaining, by a computer device, a repository of network function devices in a network;
   obtaining, by the computer device, a transport network key performance indicator (KPI) for a particular network function device in the network;
   generating, by the computer device, an administration weight based on the obtained transport network KPI, wherein the administration weight corresponds to a measure of performance associated with the particular network function device, and wherein generating the administration weight based on the obtained transport network KPI includes:
      determining a plurality of transport network KPIs for a network path associated with the particular network function device; and
      generating the administration weight based on the plurality of transport network KPIs;
   receiving, by the computer device and from a requesting network function device, a network function discovery request for a network function type; and
   providing, by the computer device, a network function discovery answer to the requesting network function device, wherein the network function discovery answer includes the generated administration weight for the particular network function device.

2. The method of claim 1, wherein obtaining the transport network KPI for the particular network function device in the network includes:
receiving the transport network KPI from a Software Defined Networking (SDN) controller associated with the network function device.

3. The method of claim 2, wherein the SDN controller is configured as an Application Function (AF) device and the transport network KPI is received via a Naf interface associated with the AF device.

4. The method of claim 1, wherein the transport network KPI includes at least one of a packet loss KPI, a packet delay KPI, or a load capacity KPI.

5. The method of claim 1, wherein generating the administration weight based on the obtained transport network KPI further includes:
generating the administration weight using a weighted sum of the plurality of transport network KPIs; and
determining whether the obtained transport network KPI satisfies a service requirement associated with a network slice associated with the particular network function device.

6. The method of claim 1, further comprising:
obtaining a wireless network KPI for the particular network function device from a Network Data Analytics Function (NWDAF) device associated with the network; and
wherein generating the administration weight is further based on the obtained wireless network KPI.

7. The method of claim 1, wherein the network function device includes a User Plane Function (UPF) device.

8. The method of claim 1, wherein the network function device is implemented as a Virtual Network Function (VNF) or a Cloud-native Network Function (CNF).

9. The method of claim 1, wherein the requesting network function device includes a Session Management Function (SMF) device or an Application Function (AF) device.

10. A computer device comprising:
a memory storing instructions; and
a processor configured to execute the instructions to:
maintain a repository of network function devices in a network;
obtain a transport network key performance indicator (KPI) for a particular network function device in the network;
generate an administration weight based on the obtained transport network KPI, wherein the administration weight corresponds to a measure of performance associated with the particular network function device, wherein, when generating the administration weight based on the obtained transport network KPI, the processor is further configured to:
determine a plurality of transport network KPIs for a network path associated with the particular network function device; and
generate the administration weight based on the plurality of transport network KPIs;
receive, from a requesting network function device, a network function discovery request for a network function type associated with the particular network function device; and
provide a network function discovery answer to the requesting network function device, wherein the network function discovery answer includes the generated administration weight for the particular network function device.

11. The computer device of claim 10, wherein, when obtaining the transport network KPI for the particular network function device in the network, the processor is further configured to:
receive the transport network KPI from a Software Defined Networking (SDN) controller associated with the network function device.

12. The computer device of claim 11, wherein the SDN controller is configured as an Application Function (AF) device and the transport network KPI is received via a Naf interface associated with the AF device.

13. The computer device of claim 10, wherein the transport network KPI includes at least one of a packet loss KPI, a packet delay KPI, or a load capacity KPI.

14. The computer device of claim 10, wherein, when generating the administration weight based on the obtained transport network KPI, the processor is further configured to:
determine whether the obtained transport network KPI satisfies a service requirement associated with a network slice associated with the particular network function device.

15. The computer device of claim 10, wherein the processor is further configured to:
obtain a wireless network KPI for the particular network function device from a Network Data Analytics Function (NWDAF) device associated with the network; and
generate the administration weight further based on the obtained wireless network KPI.

16. The computer device of claim 10, wherein the network function device includes a User Plane Function (UPF) device.

17. A system comprising:
a Network Repository Function (NRF) device configured to:
maintain a repository of network function devices in a network;
obtain a transport network key performance indicator (KPI) for a particular network function device in the network;
generate an administration weight based on the obtained transport network KPI, wherein the administration weight corresponds to a measure of performance associated with the particular network function device; and
store the generated administration weight in a record associated with the particular network function device; and
a requesting network function device configured to:
send a network function discovery request, for a network function type associated with the particular network function device, to the NRF device;
receive, from the 5G NRF device, a network function discovery answer from the NRF device, wherein the network function discovery answer includes the generated administration weight for the particular network function device; and
determine whether to select the particular network function device for a communication session, based on the received network function discovery answer.

18. The system of claim 17, further comprising:
a Software Defined Networking (SDN) controller device configured to:
measure a transport network key performance indicator (KPI) for the particular network function device in the network; and report the transport network KPI via a Naf interface to the NRF device.

19. The system of claim 17, wherein the NRF device is further configured to:
obtain a wireless network KPI for the particular network function device from a Network Data Analytics Function (NWDAF) device associated with the network; and
generate the administration weight further based on the obtained wireless network KPI.

20. The system of claim 17, wherein the transport network KPI includes at least one of a packet loss KPI, a packet delay KPI, or a load capacity KPI.

* * * * *